(12) United States Patent
Kurian et al.

(10) Patent No.: US 11,316,658 B2
(45) Date of Patent: Apr. 26, 2022

(54) SYSTEM AND METHOD FOR SECURING A DATABASE BY SCRAMBLING DATA

(71) Applicant: Bank of America Corporation, Charlotte, NC (US)

(72) Inventors: Manu J. Kurian, Dallas, TX (US); Sasidhar Purushothaman, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 150 days.

(21) Appl. No.: 16/933,382

(22) Filed: Jul. 20, 2020

(65) Prior Publication Data
US 2022/0021516 A1    Jan. 20, 2022

(51) Int. Cl.
G06F 21/00 (2013.01)
H04L 29/06 (2006.01)
H04L 9/06 (2006.01)
G06F 21/62 (2013.01)

(52) U.S. Cl.
CPC ............ H04L 9/06 (2013.01); G06F 21/6218 (2013.01)

(58) Field of Classification Search
CPC ................................ G06F 21/6218; H04L 9/06
See application file for complete search history.

(56) References Cited

U.S. PATENT DOCUMENTS

| | | |
|---|---|---|
| 5,563,946 A | 10/1996 | Cooper et al. |
| 5,870,468 A | 2/1999 | Harrison |
| 6,175,921 B1 | 1/2001 | Rosen |
| 6,272,631 B1 | 8/2001 | Thomlinson et al. |
| 6,327,578 B1 | 12/2001 | Linehan |
| 6,370,250 B1 | 4/2002 | Stein |
| 6,393,565 B1 | 5/2002 | Lockhart et al. |
| 6,968,456 B1 | 11/2005 | Tripathi et al. |
| 7,047,405 B2 | 5/2006 | Mauro |
| 7,082,197 B2 | 7/2006 | Kubota et al. |
| 7,124,170 B1 | 10/2006 | Sibert |
| 7,167,560 B2 | 1/2007 | Yu |
| 7,171,021 B2 | 1/2007 | Yoshida et al. |
| 7,185,208 B2 | 2/2007 | Gorobets |
| 7,203,319 B2 | 4/2007 | Ben-Zur et al. |
| 7,299,356 B2 | 11/2007 | Mizrah |
| 7,328,350 B2 | 2/2008 | Hird |

(Continued)

*Primary Examiner* — Anthony D Brown
*Assistant Examiner* — Rodman Alexander Mahmoudi

(57) ABSTRACT

A system is configured for managing security of a database associated with an organization. A fingerprint of an authorized user is captured. The data is scrambled using a scrambling technique. A list of users authorized to access the data is received from the user. A descrambler key corresponding to the scrambling technique is generated. The descrambler key is associated with fingerprints and predetermined location coordinates of authorized users. The descrambler key is configured to descramble the data when authorized users attempt to access the data using their fingerprints at their corresponding location coordinates. The scrambled data is encrypted. The system determines whether a particular user attempting to access the data is authorized to access the data by validating a fingerprint and location coordinates of the particular user. If the particular user is authenticated, the descrambler key descrambles the data. The particular user is allowed to access the data.

20 Claims, 4 Drawing Sheets

(56) References Cited

U.S. PATENT DOCUMENTS

| | | |
|---|---|---|
| 7,343,619 B2 | 3/2008 | Ofek et al. |
| 7,350,085 B2 | 3/2008 | Johnson et al. |
| 7,444,506 B1 | 10/2008 | Datta et al. |
| 7,487,365 B2 | 2/2009 | England et al. |
| 7,506,161 B2 | 3/2009 | Mizrah |
| 7,565,546 B2 | 7/2009 | Candelore |
| 7,567,674 B2 | 7/2009 | Nishimoto et al. |
| 7,593,620 B2 | 9/2009 | Surcouf et al. |
| 7,634,085 B1 | 12/2009 | Sahai et al. |
| 7,769,053 B2 | 8/2010 | Kubota et al. |
| 7,770,783 B2 | 8/2010 | Grant et al. |
| 7,810,113 B2 | 10/2010 | Kim et al. |
| 7,873,837 B1 | 1/2011 | Lee et al. |
| 7,962,750 B1 | 6/2011 | Gruse et al. |
| 8,295,492 B2 | 10/2012 | Suarez et al. |
| 8,429,428 B2 | 4/2013 | Ignatius et al. |
| 8,488,967 B2 | 7/2013 | Etemad et al. |
| 8,588,422 B2 | 11/2013 | Beachem et al. |
| 8,756,416 B2 | 6/2014 | Griffin |
| 8,789,201 B2 * | 7/2014 | Moskowitz ........ H04N 21/8358 455/3.06 |
| 8,914,647 B2 | 12/2014 | Dellow |
| 9,117,094 B2 | 8/2015 | Anckaert et al. |
| 9,152,805 B2 | 10/2015 | Yamashita |
| 9,461,825 B2 | 10/2016 | Rodgers et al. |
| 9,729,548 B2 | 8/2017 | Patey et al. |
| 9,760,363 B2 | 9/2017 | Dicks et al. |
| 9,871,654 B2 | 1/2018 | Huang |
| 10,142,339 B2 | 11/2018 | Liu et al. |
| 10,223,506 B2 | 3/2019 | Holt |
| 2003/0005311 A1 * | 1/2003 | Kajimura ......... H04N 21/26613 348/E7.056 |
| 2008/0205640 A1 * | 8/2008 | Shen-Orr ............. H04N 7/165 348/E7.071 |
| 2010/0208892 A1 * | 8/2010 | Courtay ............ H04N 21/6543 380/42 |
| 2013/0286443 A1 * | 10/2013 | Massicot .......... G06K 19/06178 358/3.28 |
| 2016/0241526 A1 | 8/2016 | Tola, Jr. |
| 2017/0091490 A1 | 3/2017 | Cameron |

* cited by examiner

SYSTEM AND METHOD FOR SECURING A DATABASE BY SCRAMBLING DATA

TECHNICAL FIELD

The present disclosure relates generally to database security, and more specifically to a system and method for securing a database by scrambling data.

BACKGROUND

In an organization, an ever-increasing amount of activities are conducted over computer systems. These computer systems, including proprietary and non-proprietary databases, are often storing, archiving, and transmitting different types of sensitive information. Thus, an ever-increasing need exists for ensuring data stored in these databases cannot be read by unauthorized people or otherwise exposed. Existing database securing technologies, typically, involve utilizing single-sign-on (SSO) credentials to authenticate users to access data stored in databases. However, the existing database securing technologies may be compromised by emerging malicious attacks, for example, by various cyberattacks.

SUMMARY

In one embodiment, a system for managing the security of a database associated with an organization is disclosed. The system includes a memory that stores user profiles which include the organization credentials of users associated with the organization. The user profiles include a first user profile. The first user profile includes an organization credential of the first user, a fingerprint of the first user, first location coordinates from which the first user is authorized to access the database, and a first access privilege. The system also includes a processor that is configured to receive a request form the first user to scramble data within the database. The processor captures a fingerprint of the first user. The processor scrambles the data using a scrambling technique. The processor generates a descrambler key corresponding to the scrambling technique. The descrambler key is associated with the fingerprints of authorized users. The descrambler key is associated with authorized location coordinates of the authorized users. The descrambler key is configured to descramble the data when authorized users attempt to access the data using their fingerprint at their corresponding authorized location coordinates. The processor encrypts the scrambled data. The processor determines whether a particular user attempting to access the data is authorized to access the database using an organization credential of the particular user. In response to a determination that the particular user is authorized to access the database, the processor decrypts the scrambled data. The processor determines whether the particular user is authorized to access the data by validating a fingerprint of the particular user and location coordinates of the particular user. In response to a determination that the particular user is authorized to access the data, the processor descrambles the data using the descrambler key. The processor allows the particular user to access the data.

Existing database security management technologies lack multilevel authorization provisioning utilizing SSO credentials, data encryption, and data scrambling. The lack multilevel authorization provisioning within an organization poses a risk of data exposure to third parties. For example, a third party (e.g., via cyberattacks) may access the data stored in the database by compromising the SSO credentials of an authorized user and the decryption key associated with the encryption technique used to secure the data.

Certain embodiments of this disclosure provide unique solutions to technical problems of existing database security management technologies, including those problems described above. For example, the disclosed system provides several technical advantages, which include: 1) utilizing data scrambling in addition to using data encryption and SSO credentials to secure data stored in a database; 2) generating a descrambler key to activate descrambling the data that is triggered by biometric features of authorized users, such as, for example, fingerprints of authorized users; 3) reducing a risk of exposing data within the database to an unauthorized user by identifying the sensitive data based on a particular application specific signature tag attached to the data and relocating the data to a more secured database; 4) enabling the authorized users to access the data by activating the descrambler key using their fingerprint from predetermined location coordinates with a configurable distance threshold from the center of the predetermined location coordinates; and 5) disposing of the descrambler key (by associating the descrambler key to a self-destruction code) when multiple attempts to activate the descrambler key are failed in a configurable predetermined short period of time.

As such, this disclosure may improve the underlying function of database security management technologies. This, in turn, improves the function of databases within an organization by providing multilevel security provisions to the databases including SSO credentials, data encryption, and data scrambling. Accordingly, the disclosed system provides a practical application of managing the security of the databases within the organization. As such, the disclosed system provides an additional practical application of reducing the risk of exposure of data stored in the databases. The disclosed system also provides an additional practical application of organizing the databases by identifying sensitive databases on the particular application specific signature tag; and separating the sensitive data from non-sensitive data. In a case where the sensitive data and the non-sensitive data are located in a less secured database, the disclosed system relocates the sensitive data to a more secured database. In a case where the sensitive data and the non-sensitive data are located in a highly secured database, the disclosed system relocates the non-sensitive data to a less secured database.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
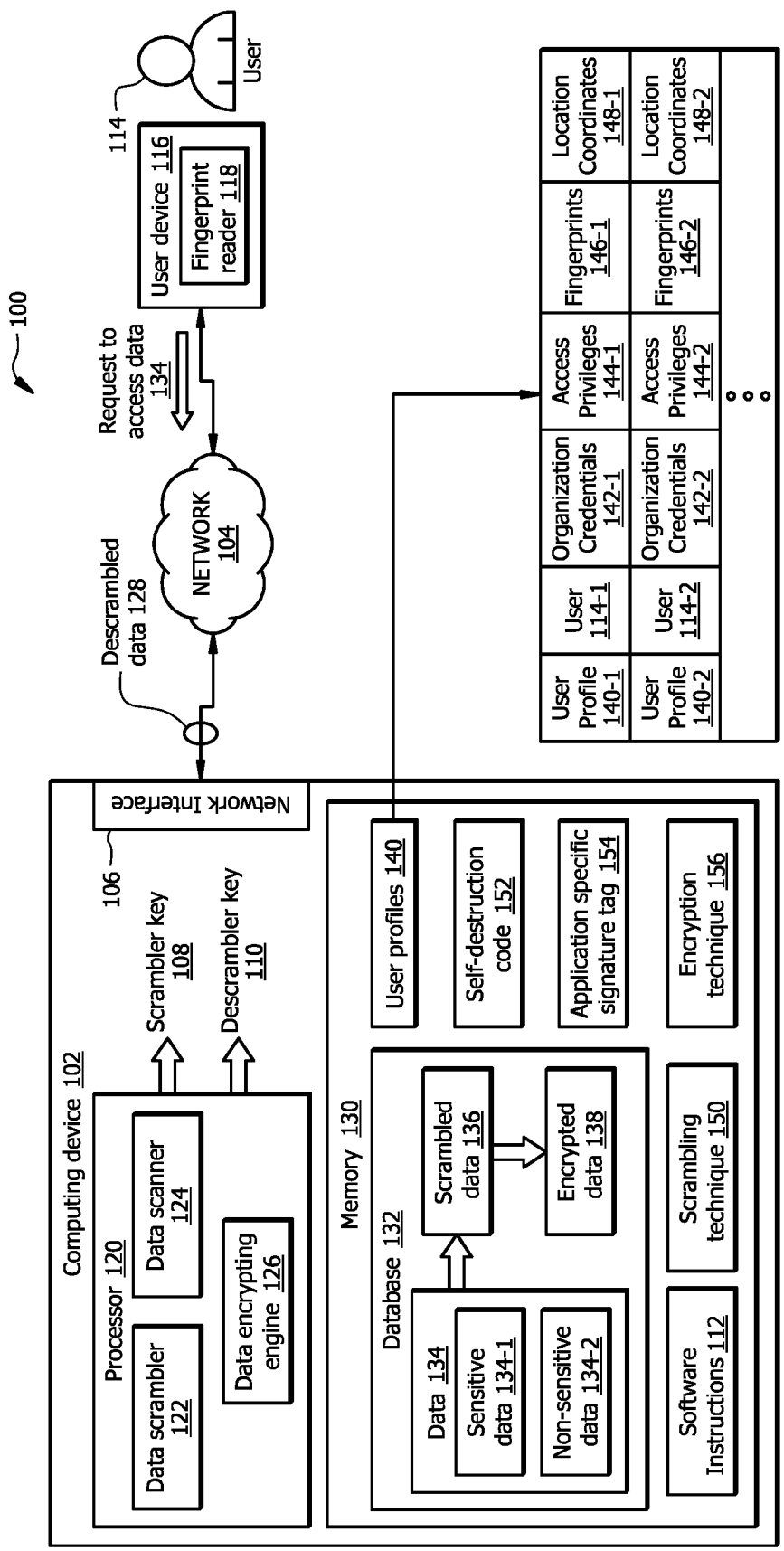
FIG. 1 illustrates one embodiment of a system configured to secure a database using data scrambling.

FIG. 1 illustrates one embodiment of a system 100 configured to secure a database 132 using data scrambling.

In one embodiment, the system 100 comprises a computing device 102 that includes processor 120 in signal communication with memory 130 and network interface 106. Memory 130 includes software instructions 112 that when executed by the processor 120 cause the computing device 102 to perform one or more functions described herein. Memory 130 also includes a database 132 that is configured to maintain and archive data 134. In one embodiment, data 134 is intended to be secured by data scrambling and data encryption. Memory 130 also includes a scrambling technique 150 used to scramble data 134; and an encryption technique 156 used to encrypt the scrambled data 136. Memory 130 also includes user profiles 140 associated with users 114, such as employees of an organization. The user profiles 140 provide information that may be used by software instructions 112 and/or processor 120. In one embodiment, the processor 120 executes software instructions 112 to implement a data scrambler 122, a data scanner 124, and a data encryption engine 126. In other embodiments, system 100 may not have all of the components listed and/or may have other elements instead of, or in addition to, those listed above.

In general, the system 100 improves the database security management technologies by utilizing data scrambling in addition to data encryption. The system 100 also improves the function of the database 132 by improving the security of the database 132. This, in turn, leads to reducing the risk of exposure of data 134. The system 100 also improves the organization of the database 132 by separating sensitive data 134-1 and non-sensitive data 134-2. In cases where sensitive data 134-1 and non-sensitive data 134-2 reside in a less secure database 132, the system 100 is configured to relocate the sensitive data 134-1 to a more secure database 132. In cases where sensitive data 134-1 and non-sensitive data 134-2 reside in a highly secure database 132, the system 100 is configured to relocate the non-sensitive data 132-2 to a less secured database 132.

Computing device 102 is generally any computing device configured to communicate with other computing devices (e.g., user devices 116), servers, etc. through the network interface 106 via network 104. The computing device 102 is configured to perform specific functions described herein and interact with users 114, e.g., via user interfaces. Examples of computing device 102 include but are not limited to desktop computers, mobile phones, tablet computers, laptop computers, servers, etc. In one embodiment, the computing device 102 may be associated with an organization, where the computing device 102 is configured to maintain and manage the security of database 132.

In one example, a user 114 may be an employee of the organization who is authorized to access the data 134 stored in the database 132. The user 114 may send a request to access the data 134 to the computing device 102 via network 104. The user device 116 is generally any computing device configured to communicate with other computing devices (e.g., computing device 102), servers, etc. through the network 104. Examples of the user device 116 include but not limited to desktop computers, mobile phones, tablet computers, laptop computers, servers, etc. In one embodiment, the user device 116 is also associated with the organization from which the user 114 logs into his/her account using his/her organization credentials 142 (e.g., single-sign-on (SSO) credentials) and sends a request to access the data 134.

Typically, within an organization, profiles of the employees of the organization (e.g., users 114) are stored in user profiles 140 which includes organization credentials 142, access privileges 144, fingerprints 146, location coordinates 148, etc. associated with the users 114. Within an organization, organization credentials 142 are assigned to the employees of the organization (e.g., users 114) to enable the employees of the organization to access their account on the organization website. The organization credentials 142 of a user 114 may include a username, such as an email address of the user 114 with the organization domain (e.g., firstname.lastname@organization.com) and a unique password determined by the user 114.

The user profiles 140 associated with the users 114, such as employees of the organization, may also include access privileges 144 associated with the users 114. The access privileges 144 of a user 114 are determined based on a position and role of the user 114 within the organization, and a sensitivity level of data 134 that the user 114 would attempt to access, where the sensitivity level of data 134 may be determined based on a content of the data 134.

For example, consider a first user 114 who is a junior employee of the organization. Thus, the first user 114 may be given low access privileges 144 to have read-only access to non-sensitive data 134-2. In another example, consider a second user 114 who is a manager of a department within the organization. Thus, the second user 114 may be given a high access privileges 144 to have the authority to access the sensitive data 134-1. The access privileges 144 of the second user 114 may include that the second user 114 is authorized to configure the access privileges 144 of other users 114 associated with the organization.

In some embodiments, the access privileges 144 of a user 114 may be associated with a retention period, which indicates a time duration that the access privileges 144 of the user 114 is valid. The retention periods associated with the access privileges 144 of users 114 may be different for each user 114 based on the position of the user 114 within the organization and the sensitivity level of data 134, which the user 114 is given access thereto. For example, consider a user 114 such as a mid-level employee of the organization who is working on a project for which the user 114 is given the access privileges 144 to have a read-only access to a particular sensitive data 134-1 for a limited time, e.g., 6 months. Thus, the retention period specified in the access privileges 144 of this particular user 114 is 6 months; and by the end of the 6 months, the read-only access of the particular sensitive data 134-1 for this user 114 will be revoked. The user profiles 140 associated with the users 114, such as employees of the organization, may also include one or more fingerprints 146 as a biometric feature to be used for identifying each user 114 and determining the access privileges 144 associated with each user 114. In some embodiments, other biometric features such as a face, voice, and/or retina of an eye of users 114 may be used for identifying the users 114 and determining their corresponding access privileges 144. In some embodiments, other features such as personal signatures of users 114 may be used for identifying the users 114 and determining their corresponding access privileges 144. The user profiles 140 associated with the users 114, such as employees of the organization, may also include one or more location coordinates 148 associated with users 114 for determining whether each user 114 accesses the data 134 from a predetermined authorized location coordinates 148. In some embodiments, the location coordinates 148 may be the global positioning system (GPS) coordinates of a user device 116 of the user 114, which may be determined by identifying the (internet protocol) IP address of the user device 116. The user profile 140 of a user 114 may include a plurality of authorized location coordinates 148, such as, a work office of the user 114 (located in the organization's building), a residential address of the user 114, etc. from where the user 114 uses one or more user devices 116 to access the data 134.

Network 104 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 104 may be configured to support any suitable type of communication protocol as would be appreciated by one of ordinary skill in the art.

Network interface 106 is configured to enable wired and/or wireless communications. The network interface 106 is configured to communicate data between the computing device 102 and other devices (e.g., user device 116), systems, or domain(s). For example, the network interface 106 may comprise a WIFI interface, a local area network (LAN) interface, a wide area network (WAN) interface, a modem, a switch, or a router. The processor 120 is configured to send and receive data using the network interface 106. The network interface 106 may be configured to use any suitable type of communication protocol as would be appreciated by one of ordinary skill in the art.

Processor 120 comprises one or more processors operably coupled to network interface 106, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 112) to implement the data scrambler 122, data scanner 124, and data encryption engine 126. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-4. For example, the processor 120 may be configured to perform the steps of method 400 as described in FIG. 4.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instruction 112, database 132, user profiles 140, self-destruction code 152, application specific signature tag 154, encryption technique 156, and/or any other data or instructions. The software instruction 112, database 132, user profiles 140, self-destruction code 152, application specific signature tag 154, and encryption technique 156 may comprise any suitable set of instructions, logic, rules, or code operable to execute the processor 120. The software instruction 112, database 132, user profiles 140, self-destruction code 152, application specific signature tag 154, and encryption technique 156 are described in more detail below.

Data Scrambler

Data scrambler 122 may be implemented using software instructions 112 executed by the processor 120, and is configured to scramble the data 134. In one embodiment, the data scrambler 122 is configured to scramble the data 134 using the scrambling technique 150. The scrambling technique 150 may include identifying data packets of the data 134; and rearranging different data packets of the data 134 from one place to another. In one example, assume that different data packets of the data 134 may be represented by different symbols, such as alphanumerical symbols 202 (See FIG. 2). In some embodiments, the scrambling technique 150 may include a plurality of steps in rearranging the alphanumerical symbols 202. The data scrambler 122 may then generate a scrambler key 108 which is a combination of the steps in rearranging the alphanumerical symbols 202. The data scrambler 122 may then generate a descrambler key 110. The descrambler key 110 includes the reversed steps of the scrambler key 108 performed in the opposite order. For example, assume that the scrambling technique 150 uses a scrambler key 108 which includes two steps to rearrange or scramble the alphanumerical symbols 202. Also assume that the alphanumerical symbols 202 are represented in rows and columns. The first step in the scrambler key 108 is to replace a first row of the alphanumerical symbols 202 with a second column of the alphanumerical symbols 202. The second step in the scrambler key 108 is to replace a second row of the alphanumerical symbols 202 with a first column of the alphanumerical symbols 202. Then, the data scrambler 122 generates the descrambler key 110 which include the reversed steps of the scrambler key 108 performed in the opposite order. In this particular example, the first step in the descrambler key 110 is the reverse of the second step of the scrambler key 108. As such, the first step in the descrambler key 110 is to replace the first column of the alphanumerical symbols 202 with the second row of the A alphanumerical symbols 202. The second step in the descrambler key 110 is the reverse of the first step of the scrambler key 108. As such, the second step in the descrambler key 110 is to replace the second column of the alphanumerical symbols 202 with the first row of the alphanumerical symbols 202. Thus, the descrambler key 110 includes the steps to recover the original order of the alphanumerical symbols 202, thus, recovering the original data 134. One example of scrambling technique 150 used to scramble the data 134 is illustrated in FIG. 2.

Example Data Scrambling Technique

Figure 2:
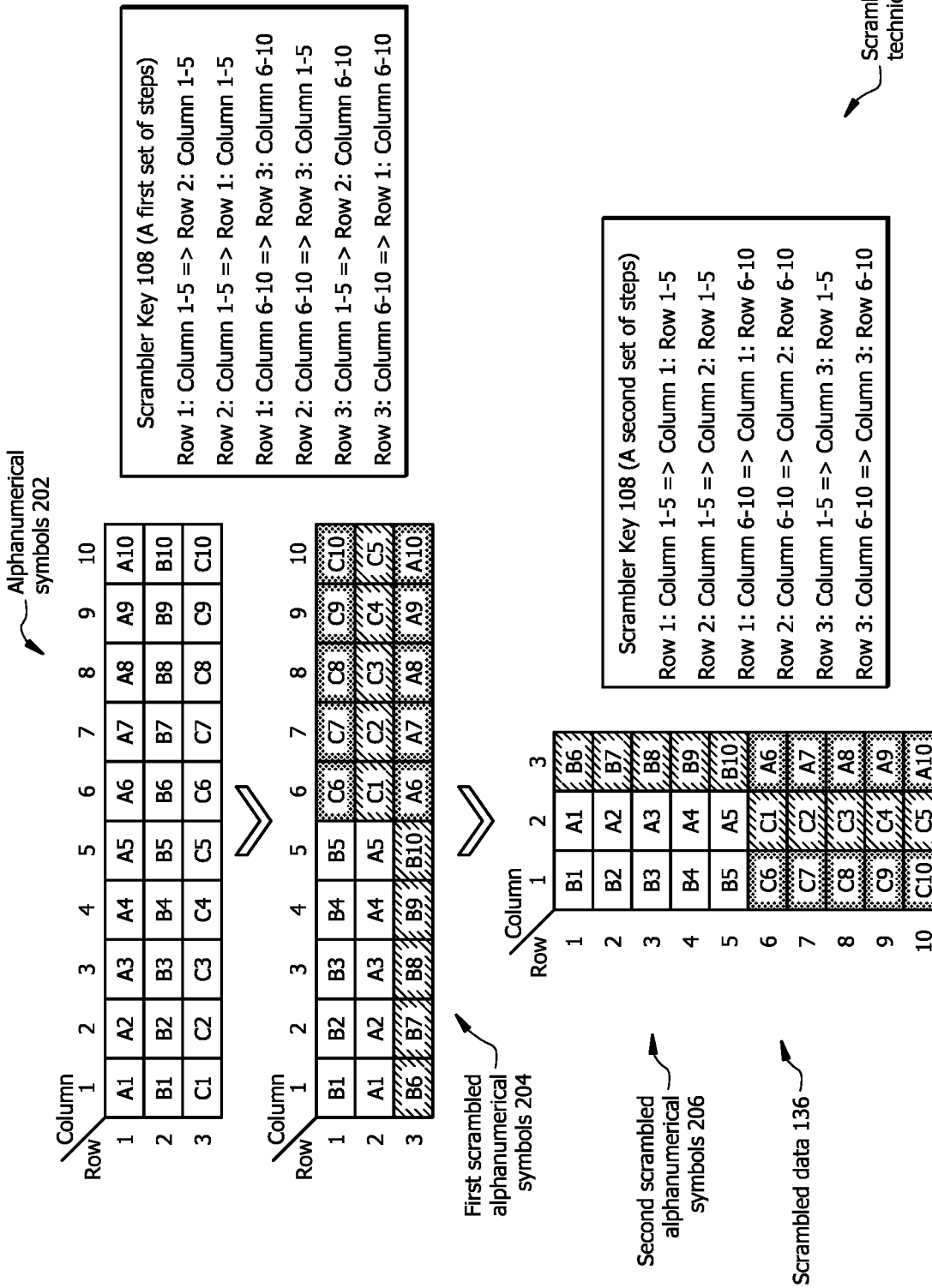
FIG. 2 illustrates one example of a scrambling technique.

FIG. 2 illustrates one example of scrambling the data 134 using the scrambling technique 150. The data scrambling technique 150, illustrated in FIG. 2, is merely exemplary and is not meant to limit the scope of the invention. In some embodiments, the data scrambler 122 may include one or more steps discussed herein or other steps in addition and/or instead of the one or more steps. In FIG. 2, alphanumerical symbols 202 representing a portion of data packets of the data 134 with 3 rows and 10 columns illustrated, where each alphanumerical symbol 202 represents a different portion of the data packets of the data 134. For example, A1 represents a first portion of the data 134 in the first row and the first column. In another example, A2 represents a second portion of the data 134 in the first row and the second column. As illustrated in the exemplary data scrambling technique 150 in FIG. 2, in a first step of the scrambler key 108 used in the scrambling of data 134, the data scrambler 122 rearranges the alphanumerical symbols 202 as below:

From row 1: columns 1-5 to row 2: columns 1-5;
From row 2: columns 1-5 to row 1: columns 1-5;
From row 1: columns 6-10 to row 3: columns 6-10;
From row 2: columns 6-10 to row 3: columns 1-5;
From row 3: columns 1-5 to row 2: columns 6-10; and
From row 3: columns 6-10 to row 1: columns 6-10.

The result of the first step of the scrambler key 108 used in the scrambling of the data 134 is a set of first scrambled alphanumerical symbols 204. In a second step of the scrambler key 108 used in the scrambling of the data 134, the data scrambler 122 rearranges the scrambled alphanumerical symbols 204 as below:

From row 1: columns 1-5 to column 1: rows 1-5;
From row 2: columns 1-5 to column 2: rows 1-5;
From row 1: columns 6-10 to column 1: rows 6-10;
From row 2: columns 6-10 to column 2: rows 6-10;
From row 3: columns 1-5 to column 3: rows 1-5; and
From row 3: columns 6-10 to column 3: rows 6-10.

The result of the second set of steps of scrambler key 108 used in the scrambling of the data 134 is a second scrambled alphanumerical symbols 206, which corresponds to the scrambled data 136 in FIG. 1. The scrambled data 136 is unreadable or unrecognizable without first being descrambled. The data scrambler 122 stores the scrambled data 136 in the database 132.

The data scrambler 122 is also configured to generate the descrambler key 110 which includes the reverse of the steps of the scrambler key 108 performed in the opposite order, as described in FIG. 1. As such, in this particular example, the first set of steps in the descrambler key 110 includes the reserve of the second set of steps of the scrambler key 108 performed in the opposite order, as below:

From column 3: rows 6-10 to row 3: columns 6-10;
From column 3: rows 1-5 to row 3: columns 1-5;
From column 2: rows 6-10 to row 2: columns 6-10;
From column 1: rows 6-10 to row 1: columns 6-10;
From column 2: rows 1-5 to row 2: columns 1-5; and
From column 1: rows 1-5 to row 1: columns 1-5.

The second set of steps in the descrambler key 110, in this particular example, includes the reverse of the first set of steps on the scrambler key 108 performed in the opposite order, as below:

From row 1: columns 6-10 to row 3: columns 6-10;
From row 2: columns 6-10 to row 3: columns 1-5;
From row 3: columns 1-5 to row 2: columns 6-10;
From row 3: columns 6-10 to row 1: columns 6-10;
From row 1: columns 1-5 to row 2: columns 1-5; and
From row 2: columns 1-5 to row 1: columns 1-5.

As such, the descrambler key 110 may be used to recover the original data 134.

The data scrambler 122 is configured to initiate the scrambling process when it receives a request from an authorized user 114 to secure the database 132 (by scrambling the data 134), in accordance with one embodiment of an operational flow of the system 100 of FIG. 1. Additional details of the operation of the data scrambler 122 are described in conjunction with the operational flow of the system 100 illustrated in FIG. 3.

Data Scanner

Referring back to FIG. 1, data scanner 124 may be implemented using software instructions 112 executed by the processor 120, and is configured to identify that the data 134 is associated with a particular software application (related to the organization) and adds an application specific signature tag 154 to the data 134.

In one embodiment, the data scanner 124 identifies whether the data 134 is associated with a particular software application by scanning each data packet within the data 134 and determining whether each data packet contains information related to the particular software application (as determined by the organization, such as specific patterns, keywords, etc.) based on the content of each data packet. For example, assume that a first portion of the data 134 includes data packets in which a name of the particular software application and a name of the organization are included any appropriate data format, e.g., in binary code, ASCII code, etc. Thus, when the data scanner 124 scans the first portion of the data 134, the data scanner 124 determines that the first portion of the data 134 includes data packets that contain the name of the particular software application and the name of the organization. Thereby, the data scanner 124 determines that the data 134 is associated with the particular software application and adds a particular application specific signature tag 154 to the data 134, for example as a header to the data packets representing the data 134. The application specific signature tag 154 may be a string of specific patterns, keywords, etc. for example, such as, a combination of the name of the organization, the name of the software application that is used for identifying the data 134.

In another embodiment, the data scanner 124 may identify the sensitive data 134-1 within the data 134 by scanning each data packet within the data 134 and determining whether each data packet contains confidential information related to the particular software application based on the content of each data packet, where the organization determines what constitutes confidential information. In some examples, the confidential information may be related to critical data that represent virtual or electronic currency used in electronic transactions, etc. In other examples, the confidential information may be related to personal information of clients of the organization, such as an account balance, account number, phone number, email address, postal address, etc.

The data scanner 124 may determine whether a data packet contains confidential information related to a particular software application, e.g., by searching for specific patterns, keywords, etc. that are predetermined by the organization. If a data packet includes one or more of those specific patterns, keywords, etc., the data scanner 124 determines that the data packet contains confidential information related to the particular software application and determines that the data packet is a portion of the sensitive data 134-1. On the other hand, if the data packet does not include any of those specific patterns, keywords, etc., the data scanner determines that the data packet is a portion of the non-sensitive data 134-2.

For example, consider a software application that provides a user interface to access and view credit card information of clients of the organization which are considered as a part of the sensitive data 134-1. Thus, the data scanner 124 may identify the data packets that include the credit card information of the clients of the organization by searching for specific patterns, keywords, etc. for example, credit card numbers etc. Once the data scanner 124 identifies the data packets that include that credit card information, the data scanner 124 determines that these data packets are considered sensitive data 134-1. As such, the data scanner 124 adds the particular application specific signature tag 154 to the sensitive data 134-1, e.g., as a header to the data packets representing the sensitive data 134-1. Additional details of the operation of the data scanner 124 are described in conjunction with the operational flow of the system 100 illustrated in FIG. 3.

Data Encryption Engine

Data encryption engine 126 may be implemented using software instructions 112 executed by the processor 120, and is configured to encrypt the scrambled data 136. In some embodiments, the data encryption engine 126 may use an encryption technique 156 to encrypt the scrambled data 136 and generate encrypted data 138. The encryption technique 156 may include a mathematical algorithm implemented in code (included in software instructions 112) to transform the scrambled data 136 into encrypted data 138 or "ciphertext" which is incomprehensible without being decrypted. For example, a portion of the encrypted data 138 may be a string of characters, symbols, etc., such as: jGk|Hl&mI^nJo. Some examples of the encryption technique 156 may be implemented by a symmetric encryption technique, such as Advanced Encryption Standard (AES), Data Encryption Standard (DES), Triple DES, etc. In general, a symmetric encryption technique uses a mathematical algorithm to generate a single key to encrypt as well as decrypt the scrambled data 136. Other examples of the encryption technique 156 may be implemented by an asymmetric encryption technique, such as Rivest-Shamir-Adleman (RSA), etc. In general, an asymmetric encryption technique uses a mathematical algorithm to generate two separate keys; one public key (shared with every user 114) and one private key (known only to a particular user 114-1 who generated the private key). The public key is used to encrypt the scrambled data 136 and the private key is used to decrypt it. Additional details of the operation of the data encryption engine 126 are described in conjunction with the operational flow illustrated in FIG. 3.

Figure 3:
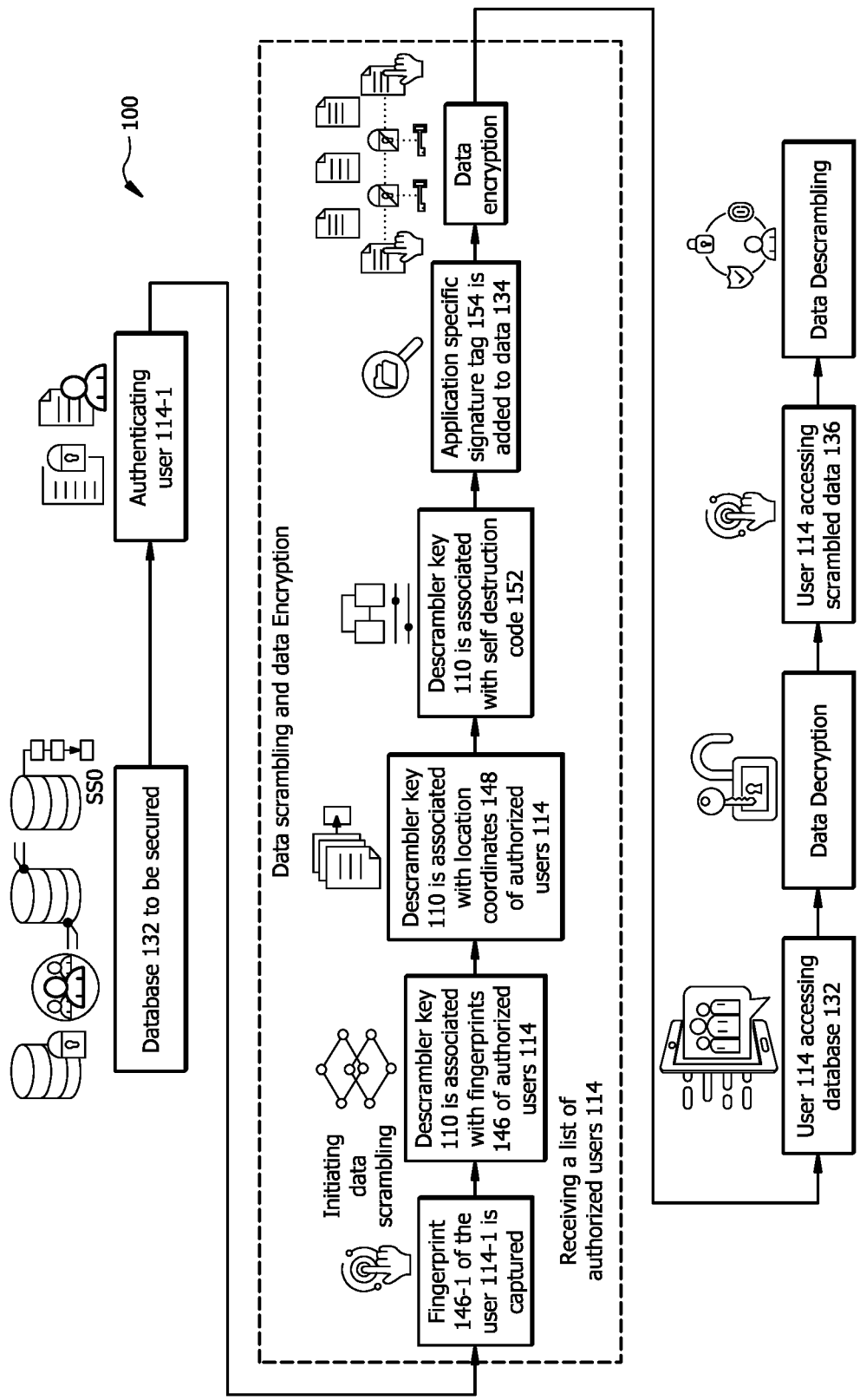
FIG. 3 illustrates one embodiment of an operational flow of the system depicted in FIG. 1.

FIG. 3 illustrates one embodiment of the operational flow of the system 100 from FIG. 1. In one embodiment, the operational flow of the system 100 begins when the database 132 is determined to be secured using data scrambling. For example, the user 114-1 may send a request to secure the database 132 e.g., via a user interface of the user device 116. The processor 120 then identifies the user 114-1 by authenticating his/her organization credentials 142-1, e.g., by requesting the user to login to his/her account using his/her SSO credentials on a webpage of the organization website.

Once the identity of the user 114-1 is authenticated, the data scrambler 122 requests the user 114-1 to provide his/her fingerprint 146-1, e.g., by requesting the user 114-1 to put his/her finger on a fingerprint reader 118 embedded or connected to the user device 116. For example, the user device 116 may be a laptop and the fingerprint reader 118 may be embedded or a plug-in fingerprint reader Flash drive. In another example, the user device 116 may be a Smartphone, and the fingerprint reader 118 may be the home button of the Smartphone.

The data scrambler 122 captures the fingerprint 146-1 and determines whether the user 114-1 is authorized to initiate the scrambling of the data 134 by searching through the user profiles 140 and matching the fingerprint 146 associated with the user 114-1 (scanned by the fingerprint reader 118) with the fingerprint 146-1 of the user 114-1 (stored in user profile 140) based on the access privilege 144-1 associated with the user 114-1. In some examples, users 114 with high access privileges 144, such as managers of departments of the organization are authorized to send the request to scramble the data 134 (i.e., securing the database 132 using data scrambling).

Once the data scrambler 122 determines that the user 114-1 is authorized to initiate the scrambling of the data 134, the data scrambler 122 initiates scrambling of the data 134 using the scrambling technique 150, for example, such as, the data scrambling technique 150 described in FIG. 2. The data scrambler 122 generates the scrambled data 136 which is unrecognizable without being descrambled. The data scrambler 122 also generates the descrambler key 110 as described in FIG. 2.

The data scrambler 122 associates the fingerprints 146-1 of the user 114-1 with the descrambler key 110. The data scrambler 122 also associates the location coordinates 148-1 of the user 114-1 to the descrambler key 110. As such, the data scrambler 122 determines whether the user 114-1 is attempting to access the data 134 from a predetermined authorized location coordinates 148-1, e.g., by comparing the GPS location coordinates of the user device 116 (using the IP address of the user device 116 from which the user 114-1 is attempting to access the data 134) with the location coordinates 148-1 stored in the user profile 140-1.

In some embodiments, the data scrambler 122 may also receive a list of authorized users 114 from the user 114-1 and associate their corresponding fingerprints 146 to the descrambler key 110. The data scrambler 122 may also associate the location coordinates 148 of the authorized users 114 to the descrambler key 110. The data scrambler 122 may identify the user profiles 140 associated with the authorized users 114 (based on the received list of authorized users 114) and extract their corresponding fingerprints 146 and location coordinates 148 in order to associate them to the descrambler key 110. As such, the data scrambler 122 determines whether any of the authorized users 114 is attempting to access the data 134 from their corresponding predetermined authorized location coordinates 148, similar as described above. Thus, any of the authorized users 114 (identified by the user 114-1) may trigger the descrambler key 110 by providing his/her fingerprint 146 when they wish to access the data 134 from their corresponding predetermined authorized location coordinates 148.

The data scrambler 122 also associates a self-destruction code 152 with the descrambler key 110. The self-destruction code 152 may be implemented by the software instructions 112, and configured to erase the descrambler key 110 when the data scrambler 122 detects one or more violations in accessing the data 134 As such, the scrambled data 136 remains safe from unauthorized users 114. In one embodiment, a violation in accessing the data 134 may be a case where multiple attempts in authenticating a fingerprint 146 associated with a user 114 are failed in a configurable short period of time, such as, for example, 10 failed attempts to authenticate a fingerprint 146 in 5 minutes. In another embodiment, consider a case where multiple attempts in authenticating a fingerprint 146 associated with a user 114 are failed in a configurable short period of time. In this case, access to the database 132 by the user 114 may be blocked for a configurable period, such as, for example, 30 minutes. After the configurable period, again, multiple attempts in authenticating the fingerprint 146 associated with the user 114 are failed in the configurable short period of time. If such a scenario persists for multiple times (e.g., 3 consecutive times), it may be considered as a violation in accessing the data 134. Thus, the self-destruction code 152 may be triggered to erase the descrambler key 110. If such violations occur, the data scrambler may alert the user 114-1 (who initiated the scrambling of the data 134), indicating that the descrambler key 110 has been erased due to a violation in accessing the data 134. Thus, the user 114-1 may recover the descrambler key 110 by requesting the data scrambler 122 to generate the descrambler key 110 again.

The data scanner 124 generates and adds a particular application specific signature tag 154 to the data 134, as described in FIG. 1. In one embodiment, the data scanner 124 may identify whether the data 134 is associated with a particular software application based on the contents of data packets representing the data 134 and adds the application specific signature tag 154 to the data 134, for example, as described in FIG. 1. In another embodiment, the data scanner 124 may identify the sensitive data 134-1 by scanning the data 134 and searching for specific patterns, keywords, etc. which indicate that the sensitive data 134-1 includes confidential information (as determined by the organization), for example, as described in FIG. 1.

In the data encryption process, in one embodiment, the data encryption engine 126 identifies the data 134 using the application specific signature tag 154 added to the data 134 and initiates the encryption of the data 134, for example, as described in FIG. 1. In another embodiment, the data encryption engine 126 identifies the sensitive data 134-1 using the added application specific signature tag 154 to the sensitive data 134-1 and initiates the encryption of the sensitive data 134-1. In some embodiments, the data encryption engine 126 may separate the sensitive data 134-1 from non-sensitive data 134-2 prior to the encrypting process. For example, if the sensitive data 134-1 and the non-sensitive data 134-2 are located in a less secured database 132, the data encryption engine 126 may relocate the sensitive data 134-1 to a more secure database 132 and then initiate the encrypting process of the sensitive data 134-1. In another example, if the sensitive data 134-1 and the non-sensitive data 134-2 are located in a highly secured database 132, the data encryption engine 126 may relocate the non-sensitive data 134-2 to a less secured database 132 and then initiate the encrypting process of the sensitive data 134-1. In some embodiments, the sensitive data 134-1 may be separated from non-sensitive data 134-2 prior to the scrambling of the sensitive data 134-1. As such, the data scrambler 122 may separate the sensitive data 134-1 from non-sensitive data 134-2 similar to discussed above and then initiate scrambling of the sensitive data 134-1. At the end of the data encryption stage, the encrypted data 138 is stored in the database 132.

When a user 114 attempts to access the encrypted data 138, the user 114 is first authenticated based on his/her organization credentials 142. Upon determining that the organization credentials 142 associated with the user 114 is authenticated, the user 114 may log in into his/her organization account on a webpage of the web site of the organization. At this stage, the data encryption engine 126 decrypts the encrypted data 138, revealing or providing the scrambled data 136 to the user 114, e.g., using a private decryption key previously shared with the user 114, for example, such as described in FIG. 1. The user 114 may view the scrambled data 136, however, the scrambled data 136 is unrecognizable without being descrambled.

If the user 114 attempts to access the scrambled data 136 (i.e., descramble the scrambled data 136), the data scrambler 122 requests the user 114 to verify his/her identity by providing his/her fingerprint 146, e.g., by putting his/her finger on a fingerprint reader 118. The data scrambler 122 captures the fingerprint 146 associated with the user 114 and determines whether the user 114 is among authorized users 114 whose fingerprints 146 are previously associated with the descrambler key 110. If the data scrambler 122 determines that the captured fingerprint 146 matches one of the fingerprints 146 associated with the previously authorized users 114, the descrambler key 110 is triggered and the scrambled data 136 is descrambled, for example, as described in FIGS. 1 and 2.

Example of a Method for Securing a Database Using Data Scrambling

Figure 4:
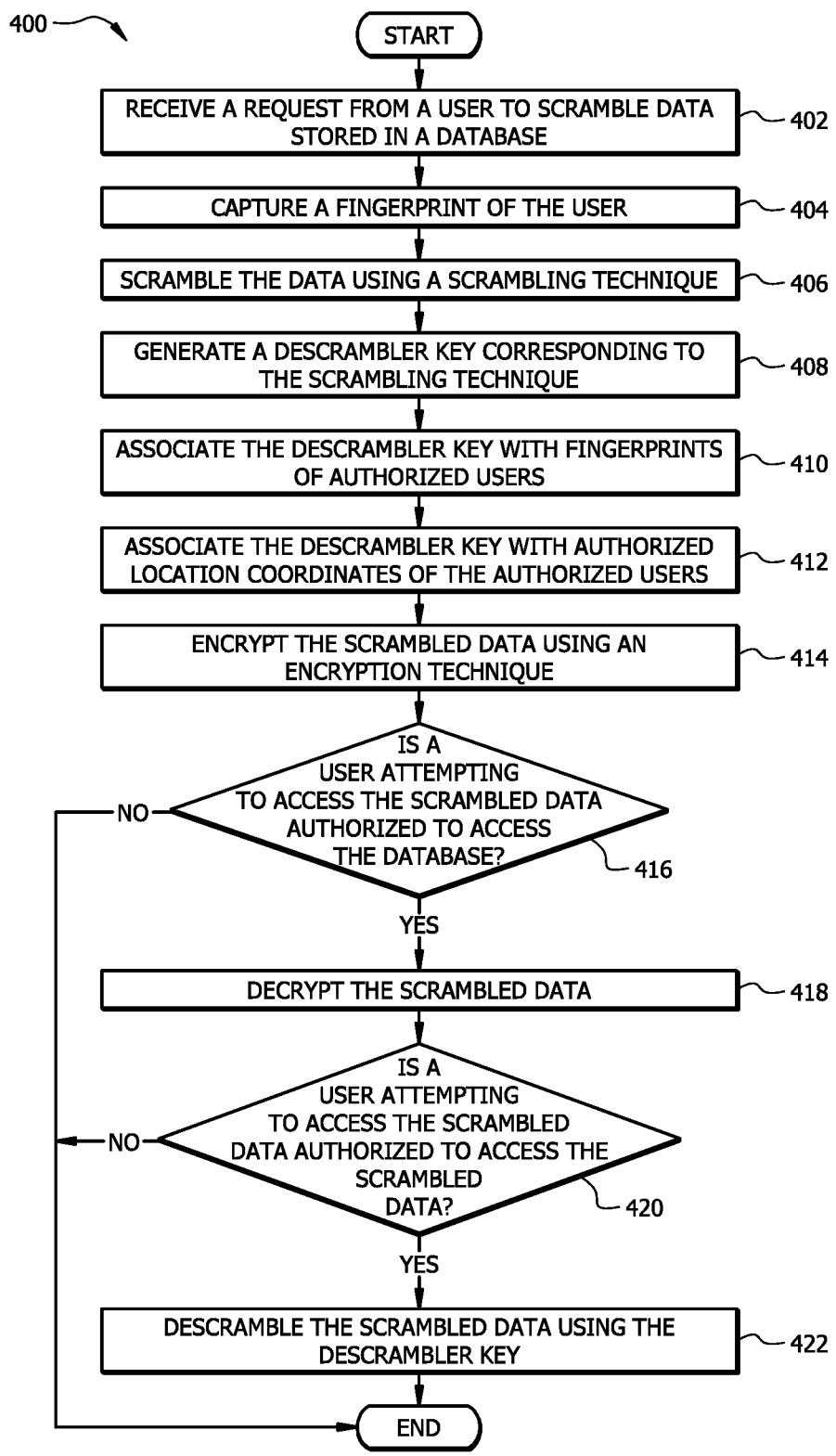
FIG. 4 illustrates an example of a flow chart of a method for securing a database using data scrambling.

FIG. 4 illustrates a flow chart of a method 400 for securing the database 132 using data scrambling. One or more of steps 402-422 of the method 400 may be implemented, at least in part, in the form of software instructions 112 stored on non-transitory, tangible, machine-readable media (e.g., memory 130) that when run by one or more processors (e.g., processor 120) may cause the one or more processors to perform steps 402-422. In some embodiments, method 400 may be performed on system 100 of FIG. 1, including the computing device 102, processor 120, data scrambler 122, data scanner 124, and data encryption engine 126. Aspects of the steps 402-422 of the method 400 have been covered in the description for FIGS. 1-3; and additional aspects are provided below.

The method 400 begins at step 402 where the user 114-1 sends a request to scramble the data 134 (i.e., securing the database 132 using data scrambling), for example, as described in FIG. 3. For example, assume that the user 114-1 is a manager of a department in the organization who is working on a proprietary project with one or more users 114. Also, assume that access privileges 144 associated with the user 114 indicate that the user 114-1 is authorized to send the request to scramble the data 134 and also the user 114-1 is authorized to identify the one or more users 114 to access the data 134. As such, the user 114-1 is asked to log in to his/her organization account using his/her organization credentials 142.

In step 404, the data scrambler 122 captures a fingerprint 146 associated with the user 114-1. In this process, the data scrambler 122 requests the user 114-1 to provide his/her fingerprint 146-1, e.g., by asking the user 114-1 to put his/her finger on a fingerprint reader 118 embedded or connected to the user device 116. The data scrambler 122 then determines whether the user 114-1 is authorized to initiate the securing the database 132 by searching through the user profiles 140 and matching the fingerprint of the user 114-1 (scanned by the fingerprint reader 118) with the fingerprint 146-1 associated with the user 114-1 (stored in user device 116) based on the access privilege 144-1 associated with the user 114-1. In other embodiments where other biometric security systems are used in identifying the user 114-1, such as face recognition, voice recognition, retinal recognition, etc., the data scrambler 122 may request the user 114-1 to identify himself/herself using his/her corresponding biometric feature, such as a face, voice, retina of his/her eye, etc. respectively.

In step 406, the data scrambler 122 scrambles the data 134 using the scrambling technique 150, such as the data scrambling technique 150 described in FIG. 2. In some embodiments, the data scrambler 122 may provide a plurality of templates of different scrambling techniques 150 to the user 114 to choose therefrom. In one example, a first template of the scrambling technique 150 may include one or more steps described in FIG. 2; and a second template of the scrambling technique 150 may include other steps in addition and/or instead of the one or more steps described in FIG. 2. In another example, the data scrambler 122 may generate a plurality of random steps to scramble the data 134, by using a step generating function to generate randomized steps, such as:

replace row (I)-column (A to A+B) to row (J)-column (A to A+B);

replace row (K)-column (B+1 to C) to row (L)-column (B+1 to C);

etc., where the row numbers are randomized (represented by I, J, K, and L parameters) and a number of fields to be rearranged are randomized (represented by A, B, and C parameters). The step generating function may also generate randomized steps, such as:

replace row (I)-column (A to A+B) to column (J)-row (A to A+B);

replace row (K)-column (B+1 to C) to column (L)-row (B+1 to C);

etc., where the fields from a randomized row are moved to a randomized column. In another example, the step generating function is configured to rearrange fields from randomized columns to randomized rows. The function may also be configured to avoid using the same parameter for rows/columns in the same step. By end of step 406, the data scrambler 122 generates the scrambled data 136 which is unrecognizable without being descrambled.

In step 408, the data scrambler 122 generates the descrambler key 110 corresponding to the scrambling technique 150 used in step 406, for example, as described in FIGS. 1 and 2. The descrambler key 110 includes the steps to unwrap or reverse the scrambling process used in the scrambling technique 150. In this process, the data scrambler 122 generates the descrambler key 110 that includes the reverse steps of the scrambler key 108 used in the scrambling technique 150 performed in the opposite order. In other words, the descrambler key 110 includes the steps to recover the original data 134. In one embodiment, the data scrambler 122 generates a log file to record the generated randomized steps (identified in the scrambler key 108) used in the scrambling technique 150. As such, the descrambler key 110 is generated which includes the reverse of the logged randomized steps performed or listed in the opposite order.

In step 410, the data scrambler 122 associates the fingerprints 146 associated with authorized users 114 to the descrambler key 110. In this process, the data scrambler 122 receives a list of authorized users 114 from the user 114-1 and associate their corresponding fingerprints 146 to the descrambler key 110. In one embodiment, the data scrambler 122 may associate the fingerprints 146 associated with the authorized users 114 (identified by the user 114-1) to the descrambler key 110 by a conditional statement such that the descrambler key 110 is triggered if any of the fingerprints 146 associated with the authorized users 114 is identified, e.g., by the fingerprint reader 118. The user 114-1 may also determine the retention periods for accessing the data 134 for each of the one or more users 114. For example, the user 114-1 may determine that a senior employee of the organization working on the proprietary project, to have a more extended retention period compared to a junior employee working on the proprietary project. The user 114-1 may also determine access privileges 144 for accessing the data 134 for each of the one or more users 114. For example, the user 114-1 may determine that the senior employee, to have a high access privilege 144 with respect to the data 134, such that the senior employee would be authorized to access the data 134, adds new information to the data 134, update the data 134, etc. In another example, the user 114-1 may determine that a junior employee, to have a low access privilege 144 with respect to the data 134, such that the junior employee would only be authorized to view the data 134. In other embodiments where other biometric security systems are used in identifying the user 114-1, such as face recognition, voice recognition, retinal recognition, etc., the data scrambler 122 may associate corresponding biometric feature, such as a face, voice, retina of his/her eye, etc. with the descrambler key 110.

In step 412, the data scrambler 122 associates the authorized location coordinates 148 corresponding to the authorized users 114 to the descrambler key 110, for example as described in FIG. 3. In one embodiment, the data scrambler 122 may associate the authorized location coordinates 148 associated with the authorized users 114 (identified by the user 114-1) to the descrambler key 110 by a conditional statement such that the descrambler key 110 is triggered if any of the authorized users 114 attempts to access the scrambled data 136 from any of his/her authorized predetermined location coordinates 148.

In some embodiments, the authorized location coordinates 148-1 corresponding to the user 114-1 may include a configurable threshold distance from the center of the authorized location coordinates 148-1. For example, consider that the authorized location coordinates 148-1 associated with the user 114-1 is the work office of the user 114-1 located in the organization's building. In this particular example, the authorized location coordinates 148-1 may include a 100 feet radius threshold distance from the work office of the user 114-1. Thus, the user 114-1 may be able to access the scrambled data 136 (upon validating his/her fingerprint 146-1) at any location within the 100 feet radius threshold distance form his/her work office. Such configurations may be useful when the user 114-1 may need to access the scrambled data 136, e.g., from a conference room located within the 100 feet radius threshold distance from his/her work office.

In some embodiments, the configurable threshold distance of an authorized location coordinates 148 is determined based on the access privileges 144 associated with the authorized user 114 and the sensitivity level of the data 134 which the authorized user 114 would attempt to access. For example, consider a first case where a first user 114 is a mid-level employee of the organization and have a medium access privileges 144 which specifies that the first user 114 is authorized to access and view but not to update the sensitive data 134-1. Also, assume that the user 114 is working on a project which includes dealing with sensitive data 134-1 with a high sensitivity level. In this case, the first user 114 is authorized to access the scrambled data 136 from the authorized location coordinates 148 associated with the first user 114, where the authorized location coordinates 148 includes a limited distance threshold, e.g., 50 feet radius, from the center of the authorized location coordinates 148. In another example, consider a second case where a second user 114 is a manager of a department of the organization and have high access privileges 144 which specifies that the second user 114 is authorized to access, view, and update the sensitive data 134-1. In this case, the second user 114 is authorized to access the scrambled data 136 from the authorized location coordinates 148 associated with the second user 114, where the authorized location coordinates 148 includes a more extended distance threshold, e.g., 150 feet radius, from the center of the authorized location coordinates 148.

In some embodiments, the distance thresholds of the authorized location coordinates 148 may be extended for one or more selected authorized users 114, such that the selected authorized users 114 may be able to access the scrambled data 136, e.g., when they are working on a proprietary project in a remote area. For example, consider a third case where a third user 114 is a research scientist working on a highly proprietary project in a remote area. Also, assume that the third user 114 have a high access privilege 144. In this case, the distance threshold of the authorized location coordinates 148 of the third user 114 may be extended to the remote area; and the third user may access the scrambled data 136 by providing his/her fingerprint 146 on his/her user device 116

In some embodiments, authorized users 114, such as the user 114-1 may be associated with multiple authorized location coordinates 148-1, such as, the work office of the user 114-1 (located in the organization's building), a residential address of the user 114-1, etc., from where the user 114-1 uses one or more user devices 116 to login into his/her organization account and access database 132. As such, the data scrambler 122 associates the multiple authorized location coordinates 148-1 of the user 114-1 to the descrambler key 110.

In step 414, the data encryption engine 126 encrypts the scrambled data 136 using the encryption technique 156, for example, as described in FIGS. 1 and 3. In this process, the data encryption engine 126 identifies the data 134 using the added application specific signature tag 154 (by the data scanner 124) to the data 134 and initiates the encryption of the data 134, for example, as described in FIGS. 1 and 3. By the end of the step 414, the data encryption engine 126 has generated the encrypted data 138 and stores it in the database 132.

In step 416, the data scrambler 122 determines whether a user 114 attempting to access the database 132 is authorized to access the database 132 by validating his/her organization credentials 142, for example, as described in FIGS. 1 and 3. If the data scrambler 122 determines that the user 114 is not authorized to access the database 132, the method 400 is terminated and the user 114 may not access the database 132. In one example, the user 114 may not be authorized to access the database 132 because a retention period for accessing the database 132 by the user 114 is expired. If, however, data scrambler 122 determines that the user 114 is authorized to access the database 132, the method 400 proceeds to step 418.

In step 418, the data encryption engine 126 decrypts the encrypted data 138, e.g., using a private decryption key previously shared with the user 114, for example, such as described in FIGS. 1 and 3. At this stage, the user 114 may view the scrambled data 136, however, the scrambled data 136 is unrecognizable without being descrambled.

In step 420, the data scrambler 122 determines that whether the user 114 attempting to access the scrambled data 136 is authorized to access it. If the data scrambler 122 determines that the user 114 is not authorized to access the scrambled data 136, the method 400 is terminated and the user 114 may not access the scrambled data 136. If, however, the data scrambler 122 determines that the user 114 is authorized to access the scrambled data 136, the method 400 proceeds to step 422.

In this process, the data scrambler 122 requests the user 114 to provide his/her fingerprint 146, e.g., by putting his/her finger on a fingerprint reader 118. The data scrambler 122 captures the fingerprint 146 associated with the user 114 and determines whether the user 114 is among authorized users 114 whose fingerprints 146 are previously associated with the descrambler key 110. The data scrambler 122 determines whether the user 114 is among the authorized users 114, e.g., by searching through the user profiles 140 associated with the authorized users 114 (previously determined by the user 114-1) and matching the captured fingerprint 146 associated with the user 114 with a fingerprint 146 associated with one of the authorized users 114 (stored in the user profile 140 of the authorized user 114).

The data scrambler 122 also determines whether the user 114 is attempting to access the scrambled data 136 from his/her authorized location coordinates 148. In this process, the data scrambler 122 determines the location coordinates 148, from where the user 114 is attempting to access the scrambled data 136, e.g., by identifying the GPS coordinates of a user device 116 based on the IP address of the user device 116 from which the user 114 is attempting to access the scrambled data 136. If the determined location coordinates 148 of the user device 116 matches any of the predetermined authorized location coordinates 148 of the user 114 (stored in the user profile 140 of the user 114), the data scrambler 122 determines that the user 114 is attempting to access the scrambled data from an authorized location coordinates 148.

If the data scrambler 122 determines that the captured fingerprint 146 associated with the user 114 matches one of the fingerprints 146 associated with the previously authorized users 114, and the location coordinates 148 of the user device 116, from which the user 114 is attempting to access the scrambled data 136, the method 400 proceeds to step 422. In step 422, the descrambler key 110 is triggered and the scrambled data 136 is descrambled, for example, as described in FIGS. 1 and 2. Thus, the user 114 may access the data 134 as determined based on his/her access privilege 144.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for managing security of a database associated with an organization, comprising:
   a memory that stores user profiles comprising organization credentials of users associated with the organization, the user profiles comprising a first user profile, wherein:
      the first user profile comprises an organization credential of the first user, a fingerprint of the first user, first location coordinates from which the first user is authorized to access the database, and a first access privilege; and
   a processor operably coupled to the memory, configured to:
      receive a request from the first user to scramble data within the database;
      capture a fingerprint of the first user;
      scramble the data using a scrambling technique;
      store a list of users authorized to access the data from the first user;
      generate a descrambler key corresponding to the scrambling technique, wherein:
         the descrambler key is associated with fingerprints of authorized users; and
         the descrambler key is associated with authorized location coordinates of the authorized users, the descrambler key is configured to descramble the data when authorized users attempt to access the data using their fingerprints at their corresponding authorized location coordinates;
      encrypt the scrambled data;
      determine whether a particular user attempting to access the data is authorized to access the database using an organization credential of the particular user;
      in response to a determination that the particular user is authorized to access the database, decrypt the scrambled data;
      determine whether the particular user is authorized to access the data by validating a fingerprint of the particular user and location coordinates of the particular user;
      in response to a determination that the particular user is authorized to access the data, descramble the data using the descrambler key; and
      allow the particular user to access the data.

2. The system of claim 1, wherein identifying the first user using the fingerprint of the first user comprises:
   determining whether the captured fingerprint of the first user matches the fingerprint of the first user stored in the first user profile; and
   in response to a determination that the captured fingerprint of the first user matches the stored fingerprint of the first user, identify the first user.

3. The system of claim 1, wherein scrambling the data using the scrambling technique comprises:
   identifying binary codes of the data;
   rearranging a first plurality of binary codes of the data from a first position to a second position; and
   rearranging a second plurality of binary codes of the data from the second position to the first position.

4. The system of claim 1, wherein:
   the first location coordinates comprise a first threshold distance from the center of the first location coordinates, the first threshold distance is determined based at least in part upon a sensitivity level of the data and access privileges of the first user.

5. The system of claim 1, wherein the processor is further configured to:
   associate the descrambler key to a self-destruction code, wherein the self-destruction code is configured to erase the descrambler key when multiple attempts to authenticate a fingerprint of a user are failed within a predetermined period of time.

6. The system of claim 1, wherein the data stored in the database comprises sensitive data and non-sensitive data, the processor is further configured to:
   add a particular application specific signature tag to the sensitive data, the particular application specific signature tag is generated based at least in part upon content of the sensitive data; and
   move the non-sensitive data to another location prior to encrypting the data.

7. The system of claim 1, wherein determining whether the particular user is authorized to access the data comprises:
   determining whether the fingerprint of the particular user matches any of the fingerprints of authorized users;
   in response to determining that the fingerprint of the particular user matches a fingerprint of an authorized user, determining whether the location coordinates of the particular user is within a threshold distance of the authorized location coordinates associated with the authorized user; and
   in response to determining that the location coordinates of the particular user are within a threshold distance of the authorized location coordinates associated with the authorized user, determining that the particular user is authorized to access the data.

8. A method for managing security of a database associated with an organization, comprising:
   receiving a request from a first user to scramble data within the database;
   capturing a fingerprint of the first user;
   scrambling the data by a processor using a scrambling technique;
   storing a list of users authorized to access the data from the first user;
   generating by the processor a descrambler key corresponding to the scrambling technique, wherein:
      the descrambler key is associated with fingerprints of authorized users; and
      the descrambler key is associated with authorized location coordinates of the authorized users, the descrambler key is configured to descramble the data when authorized users attempt to access the data using their fingerprints at their corresponding authorized location coordinates;
   encrypting by the processor the scrambled data;
   determining whether a particular user attempting to access the data is authorized to access the database using an organization credential of the particular user;
   in response to a determination that the particular user is authorized to access the database, decrypting the scrambled data;
   determining whether the particular user is authorized to access the data by validating a fingerprint of the particular user and location coordinates of the particular user;

in response to a determination that the particular user is authorized to access the data, descrambling the data using the descrambler key; and allowing the particular user to access the data.

9. The method of claim 8, wherein identifying the first user using the fingerprint of the first user comprises:

determining whether the captured fingerprint of the first user matches the fingerprint of the first user stored in a first user profile associated with the first user; and in response to a determination that the captured fingerprint of the first user matches the stored fingerprint of the first user, identify the first user.

10. The method of claim 8, wherein scrambling the data using the scrambling technique comprises:

identifying binary codes of the data;

rearranging a first plurality of binary codes of the data from a first position to a second position; and rearranging a second plurality of binary codes of the data from the second position to the first position.

11. The method of claim 8, wherein:

first location coordinates, associated with the first user, comprise a first threshold distance from the center of the first location coordinates, the first threshold distance is determined based at least in part upon a sensitivity level of the data and access privileges of the first user.

12. The method of claim 8, wherein the method further comprising:

associating the descrambler key to a self-destruction code, wherein the self-destruction code is configured to erase the descrambler key when multiple attempts to authenticate a fingerprint of a user are failed within a predetermined period of time.

13. The method of claim 8, wherein the data stored in the database comprises sensitive data and non-sensitive data, the method further comprising:

adding a particular application specific signature tag to the sensitive data, the particular application specific signature tag is generated based at least in part upon content of the sensitive data; and moving the non-sensitive data to another location prior to encrypting the data.

14. The method of claim 8, wherein determining whether the particular user is authorized to access the data comprises:

determining whether the fingerprint of the particular user matches any of the fingerprints of authorized users;

in response to determining that the fingerprint of the particular user matches a fingerprint of an authorized user, determining whether the location coordinates of the particular user is within a threshold distance of the authorized location coordinates associated with the authorized user; and in response to determining that the location coordinates of the particular user are within a threshold distance of the authorized location coordinates associated with the authorized user, determining that the particular user is authorized to access the data.

15. A computer program comprising executable instructions stored in a non-transitory computer-readable medium that when executed by a processor causes the processor to:

receive a request from a first user to scramble data within a database;

capture a fingerprint of the first user;

scramble the data using a scrambling technique;

store a list of users authorized to access the data from the first user;

generate a descrambler key corresponding to the scrambling technique, wherein:

the descrambler key is associated with fingerprints of authorized users; and the descrambler key is associated with authorized location coordinates of the authorized users, the descrambler key is configured to descramble the data when authorized users attempt to access the data using their fingerprints at their corresponding authorized location coordinates;

encrypt the scrambled data;

determine whether a particular user attempting to access the data is authorized to access the database using an organization credential of the particular user;

in response to a determination that the particular user is authorized to access the database, decrypt the scrambled data;

determine whether the particular user is authorized to access the data by validating a fingerprint of the particular user and location coordinates of the particular user;

in response to a determination that the particular user is authorized to access the data, descramble the data using the descrambler key; and allow the particular user to access the data.

16. The computer program of claim 15, wherein identifying the first user using the fingerprint of the first user comprises:

determining whether the captured fingerprint of the first user matches the fingerprint of the first user stored in a first user profile associated with the first user; and in response to a determination that the captured fingerprint of the first user matches the stored fingerprint of the first user, identify the first user.

17. The computer program of claim 15, wherein scrambling the data using the scrambling technique comprises:

identifying binary codes of the data;

rearranging a first plurality of binary codes of the data from a first position to a second position; and rearranging a second plurality of binary codes of the data from the second position to the first position.

18. The computer program of claim 15, wherein:

first location coordinates, associated with the first user, comprise a first threshold distance from the center of the first location coordinates, the first threshold distance is determined based at least in part upon a sensitivity level of the data and access privileges of the first user.

19. The computer program of claim 15, wherein the processor is further configured to:

associate the descrambler key to a self-destruction code, wherein the self-destruction code is configured to erase the descrambler key when multiple attempts to authenticate a fingerprint of a user are failed within a predetermined period of time.

20. The computer program of claim 15, wherein determining whether the particular user is authorized to access the data comprises:

determining whether the fingerprint of the particular user matches any of the fingerprints of authorized users;

in response to determining that the fingerprint of the particular user matches a fingerprint of an authorized user, determining whether the location coordinates of the particular user is within a threshold distance of the authorized location coordinates associated with the authorized user; and in response to determining that the location coordinates of the particular user are within a threshold distance of the authorized location coordinates associated with the authorized user, determining that the particular user is authorized to access the data.

* * * * *